(12) United States Patent
Wagener et al.

(10) Patent No.: US 10,226,787 B2
(45) Date of Patent: Mar. 12, 2019

(54) METHOD FOR COATING A CYLINDER WALL OF AN INTERNAL COMBUSTION ENGINE

(71) Applicants: BAYERISCHE MOTOREN WERKE AKTIENGESELLSCHAFT, München (DE); TECHNISCHE UNIVERSITÄT MÜNCHEN, München (DE)

(72) Inventors: Wolfram Wagener, Geisenhausen (DE); Patrick Woisetschlaeger, Straubing (DE)

(73) Assignees: BAYERISCHE MOTOREN WERKE AKTIENGESELLSCHAFT, München (DE); TECHNISCHE UNIVERSITÄT MÜNCHEN, München (DE)

( * ) Notice: Subject to any disclaimer, the term of this patent is extended or adjusted under 35 U.S.C. 154(b) by 0 days.

(21) Appl. No.: 14/912,804

(22) PCT Filed: Jul. 31, 2014

(86) PCT No.: PCT/EP2014/002116
§ 371 (c)(1),
(2) Date: Feb. 18, 2016

(87) PCT Pub. No.: WO2015/024628
PCT Pub. Date: Feb. 26, 2015

(65) Prior Publication Data
US 2016/0193626 A1    Jul. 7, 2016

(30) Foreign Application Priority Data
Aug. 21, 2013    (DE) .................. 10 2013 013 830

(51) Int. Cl.
*B05D 1/02* (2006.01)
*C21D 7/08* (2006.01)
(Continued)

(52) U.S. Cl.
CPC .................. *B05D 1/02* (2013.01); *B24C 1/00* (2013.01); *C21D 7/08* (2013.01); *C23C 4/02* (2013.01);
(Continued)

(58) Field of Classification Search
None
See application file for complete search history.

(56) References Cited

U.S. PATENT DOCUMENTS

| 5,630,953 A * | 5/1997 | Klink | ................. B23K 26/0084 219/121.69 |
| 2009/0175571 A1* | 7/2009 | Boehm | ..................... C23C 4/02 384/625 |

(Continued)

FOREIGN PATENT DOCUMENTS

| CN | 101379212 A | 3/2009 |
| CN | 101928908 A | 12/2010 |

(Continued)

*Primary Examiner* — James Mellott
(74) *Attorney, Agent, or Firm* — DeLio, Peterson & Curcio, LLC; Robert Curcio

(57) ABSTRACT

A method for coating a cylinder wall of an internal combustion engine, in which the cylinder wall is roughened prior to coating, such that the cylinder wall is compressed prior to roughening by plastic deformation.

5 Claims, 2 Drawing Sheets

(51) Int. Cl.
  *C23C 4/02* (2006.01)
  *F16J 10/04* (2006.01)
  *B24C 1/00* (2006.01)
  *C23C 4/131* (2016.01)
  *C22F 1/04* (2006.01)

(52) U.S. Cl.
  CPC .............. *C23C 4/131* (2016.01); *F16J 10/04* (2013.01); *C21D 2261/00* (2013.01); *C22F 1/04* (2013.01)

(56) References Cited

U.S. PATENT DOCUMENTS

2010/0326270 A1* 12/2010 Doerfler .................... B23P 9/00
  92/169.1
2013/0319063 A1* 12/2013 Schmid .................... B21H 7/18
  72/252.5

FOREIGN PATENT DOCUMENTS

| CN | 102016098 A | 4/2011 | |
|----|----|----|----|
| CN | 103109116 A | 5/2013 | |
| DE | 10111569 A1 | 9/2002 | |
| DE | 102004038176 A1 | 3/2006 | |
| DE | 10 2009 030 683 A1 | 1/2011 | |
| DE | 102009030683 A1 * | 1/2011 | |
| DE | 10 2009 027 200 B3 | 4/2011 | |
| EP | 2267178 A2 | 12/2010 | |
| WO | WO-2012084612 A1 * | 6/2012 | .............. B21H 7/18 |
| WO | 2012095215 A1 | 7/2012 | |

* cited by examiner

METHOD FOR COATING A CYLINDER WALL OF AN INTERNAL COMBUSTION ENGINE

BACKGROUND OF THE INVENTION

1. Field of the Invention

The invention relates to a method for coating a cylinder wall of an internal combustion engine in which this is roughened beforehand in order to improve the adhesion of the coating.

2. Description of Related Art

For reasons of weight, internal combustion engines in motor vehicles are frequently designed with an engine block made of light metal, in particular an aluminum alloy. However, it can prove problematic here that, due to the tribological properties of the light metal, in particular the comparatively poor resistance to wear, the walls of the cylinders formed by the engine block are only inadequately suitable as running surfaces for the pistons.

In order to avoid these problems, in many internal combustion engines with an engine block made of light metal cylinder liners made of, for example, grey cast iron are used, as a result of which the advantages of the light metal (low specific weight) can be combined with those of the grey cast iron (good tribological properties).

Alternatively, it is known for the cylinder walls of the light metal engine block to be provided with a coating in order to realize the desired tribological properties for the running surfaces. Such a coating is regularly realized by melting the coating material and spraying it onto the cylinder walls.

It is of particular importance in the coating of cylinder walls to achieve a good adhesion of the coating layer to the base material. For this purpose it is known for the cylinder walls of the engine block to be roughened prior to coating in order to increase the contact surface area between the layers. In many cases an attempt is also made to form undercuts in the roughened cylinder walls into which the melted coating material can penetrate in order to achieve a form-locking connection with the cylinder walls following hardening.

Various different possible ways of roughening cylinder walls are known.

On the one hand, methods known as "high pressure blasting" are used, in which the cylinder walls are blasted with (solid) particles or a liquid under high pressure. As a result, particles of the wall material are broken out and the wall material is plastically deformed at individual points. In particular, blasting with sand or corundum, which are delivered by means of compressed air, and blasting with water or an emulsion are widely used. The compressed air or the liquid are thereby delivered from the nozzles which are used under a very high pressure of, regularly, 1500 bar to 3500 bar. One disadvantage of high pressure blasting is the rapid wear on the nozzles due to the high pressure, possibly in combination with the erosion caused by an abrasive material. In addition, adherence to tolerances of form and position is difficult and therefore associated with considerable expense and effort. And finally, this involves a high consumption of the medium used, which in some cases can also be associated with considerable effort expended on its preparation for recycling.

It is also known for cylinder walls to be roughened mechanically. This can for example be achieved through rough grinding or grooving. In this case, grooves or corrugations are formed in the cylinder walls in a cutting or non-cutting process using one or more tools.

It is for example known from DE 10 2009 027 200 B3, for the purpose of roughening a cylinder wall, in one method step to introduce a helical groove with, in particular, rectangular or trapezoidal cross section into the cylinder wall. This can be achieved using both cutting and non-cutting processes. In a second step, the rib running helically between the grooves is then plastically deformed in a radial direction in order to form undercuts. In order to introduce the groove a tool is used which has a single blade, the tool being both driven so as to rotate as well as being moved axially along the longitudinal axis of the cylinder.

Alternative methods for preparing cylinder walls for a subsequent coating include chemical and electrical roughening, brushing and spraying with adhesive primer.

SUMMARY OF THE INVENTION

Starting out from this prior art, the invention was based on the problem of improving the quality of the anchoring of a coating layer to a cylinder wall.

This problem is solved through a method according to the independent claims Advantageous embodiments of the method according to the invention are the subject matter of the dependent claims and are explained in the following description of the invention.

The above and other objects, which will be apparent to those skilled in the art, are achieved in the present invention which is directed to a method for coating a cylinder wall of an internal combustion engine in which the cylinder wall is roughened prior to coating, wherein the cylinder wall is compressed prior to roughening by plastic deformation. The cylinder wall may only compressed in parts, or may be compressed such that several compressed and uncompressed sections of the cylinder wall are created in alternating sequence.

The roughening may be achieved through blasting with a liquid or particulate medium.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
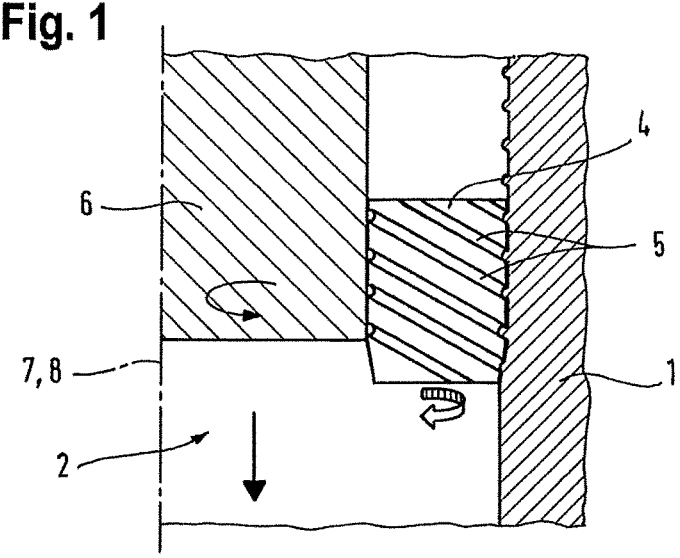
FIG. 1 shows a partial compression of a cylinder wall as a first step of a method according to the invention for coating the cylinder wall.
Figure 2:
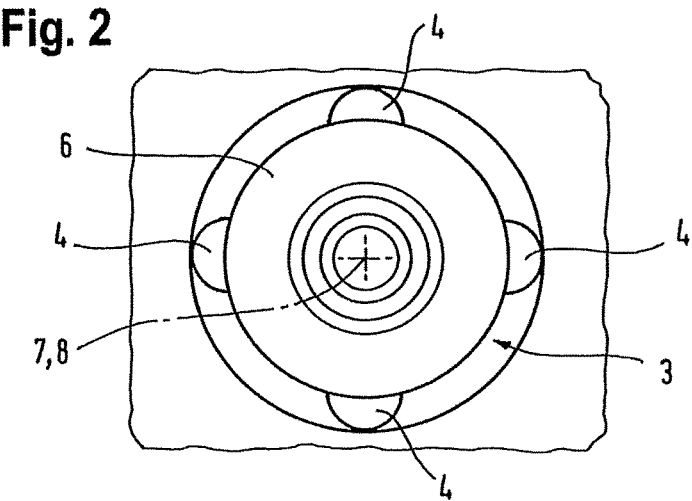
FIG. 2 shows a top view of the cylinder which is to be coated with the tool used for compression.

In describing the preferred embodiment of the present invention, reference will be made herein to FIGS. 1-6 of the drawings in which like numerals refer to like features of the invention.

The invention is based on the finding that the adhesion of a coating layer to a cylinder wall is also determined, to a not insignificant degree, by the quality of the base material of the engine block forming the cylinders. Engine blocks are mostly manufactured through casting, which is virtually inevitably associated with the formation of inhomogeneities, for example voids, porosity or other structural faults. These inhomogeneities can adversely affect the adhesion of the coating, since there can be insufficient bonding of the coating layer to the base material at the site of the imperfections.

Starting out from this, the invention is based on the idea of having already removed the inhomogeneities, at least in the vicinity of the surface, prior to roughening.

For this purpose, a generic method for coating a cylinder wall of an internal combustion engine in which the cylinder wall is roughened prior to coating is further developed in that the cylinder wall is compressed, at least in parts, through plastic deformation prior to roughening.

As a result of the compression of the cylinder, structural voids can in particular be sealed and porosity thus reduced. Particles which are only loosely incorporated in the base material can also be anchored more firmly. This can ensure that the subsequently applied coating layer is better anchored to the base material.

Moreover, compression through the method according to the invention can also allow a fundamentally increased strength of the base material surrounding the cylinder to be achieved. This can reduce the risk of a deformation of the cylinder during the later operation of the internal combustion engine.

"Roughening" is understood to mean the introduction or exposure of a plurality of depressions in the cylinder wall.

In a preferred embodiment of the method according to the invention it can be the case that the cylinder wall is only compressed in parts, and in particular several compressed and uncompressed sections of the cylinder wall are created in alternating sequence. This can in particular facilitate and/or accelerate the roughening of the cylinder wall subsequent to compression. In particular, the fact that the uncompressed sections can be eroded using less force or less energy in comparison with the compressed sections of the cylinder can be exploited. Conversely, using substantially the same force or energy during the roughening process, a structure of the cylinder wall can thus be created which can for example resemble the groove structure known from DE 10 2009 027 200 B3, i.e., in particular with one or more circumferential, in particular helically circumferential grooves. Moreover, it can thereby be advantageous that the groove structure formed according to the invention can have less exactly formed corners and edges, as a result of which notch effects which these corners and edges can have, in particular in the coating layer which reproduces the groove structure in negative form, can be reduced.

Particularly preferably, it can be the case that the roughening is achieved through blasting with (at least one) liquid (for example water or an emulsion) and/or particulate (for example sand and/or corundum) medium. This can have the advantage that, through the increased erosion of the base material by means of the medium in the uncompressed sections, a macrostructure resembling, for example, the groove structure known from DE 10 2009 027 200 B3 is formed, which is in addition overlaid with a microstructure consisting of numerous micro-depressions, which is typical of roughening through blasting. Overall, this allows a particularly good interlocking and thus adhesion of the coating layer to the cylinder wall to be realized.

"Micro-depressions" are understood to mean depressions the dimensions of which are smaller (in particular corresponding to a lesser fraction) than the comparable dimensions of the depression structure exposed as a result of an only partial compression (macrostructure).

In addition to blasting, roughening can also be achieved through exposure by means of a laser and/or through mechanical processing, for example, whereby the advantages of a cylinder wall which is only compressed in parts can also be exploited using these methods.

"Mechanical roughening" is understood to mean a process in which depressions are created in the wall of the cylinder by means of at least one tool mounted on a processing machine through direct contact using cutting or non-cutting methods (i.e. through plastic deformation).

The coating can be applied in any manner known within the prior art, whereby a thermal spraying method in which the coating material is sprayed in a molten state onto the cylinder wall and hardens there can preferably be used. Examples of thermal spraying methods include wire arc spraying and plasma coating.

FIGS. 1 to 5 show, in diagrammatic representations, different steps of a method according to the invention for coating a (cylinder) wall of a cylinder 2 formed by an engine block 1, together with the equipment used for this purpose.

The engine block 1 can be designed as a cast component made of a light metal and in particular an aluminum alloy. The cast component and in particular the cylinder wall can already have been processed mechanically and in particular milled and/or turned smooth before a method according to the invention as described below is carried out.

In a first step of the method according to the invention, the cylinder wall is (in parts) compressed in the vicinity of its surface through partial plastic deformation of the base material of the engine block 1. A roller burnishing tool 3 is used for this purpose which comprises a plurality of roller burnishing bodies 4 which have peripheral depressions 5 running around their outer sides. The roller burnishing bodies 4 are arranged around the circumference in recesses of a base body 6 of the roller burnishing tool 3, projecting beyond the outer side of the base body 6 in a radial direction. The rotatingly driven roller burnishing tool 3 is moved along the longitudinal axis 7 of the cylinder 2, the plastic deformation being realized in that the (largest) circumference formed by the roller burnishing bodies 4 is larger in diameter than the inner diameter of the cylinder 2 (prior to compression). Insertion of the roller burnishing tool 3 into the cylinder 2 is made possible through a conical design of the initial sections of the roller burnishing bodies 4. Those sections of the cylinder wall which, when in contact with the roller burnishing bodies 4, are arranged in the region of the depressions 5 are not compressed, or are only slightly compressed. The partial compression of the cylinder wall leads to a structure in which the groove-formed depressions alternate with intervening ribs, whereby the ribs are not compressed or are less compressed. Alternatively, a cylinder wall which is compressed in parts can also be achieved in that regions of the cylinder wall defined by the roller burnishing tool 3 are not travelled over.

The roller burnishing bodies 4 of the roller burnishing tool 3 are arranged equally distributed around a longitudinal axis 8 of the base body 6, which during use of the roller burnishing tool 3 is preferably substantially coaxial to the longitudinal axis 7 of the cylinder 2. As a result, reaction forces transmitted to the base body 6 by two opposing roller burnishing bodies 4 can substantially balance one another out. This allows the loading of the roller burnishing tool 3 and a device driving this (not shown) to be reduced.

Figure 3:
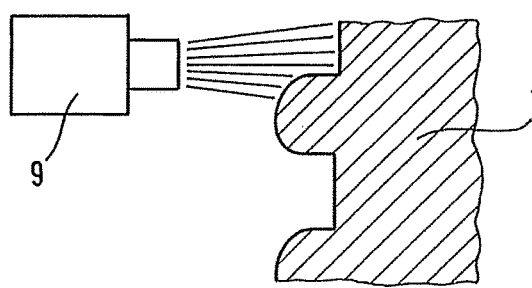
FIG. 3 shows a blasting of the cylinder wall as a second step of a method according to the invention for coating the cylinder wall.
Figure 4:
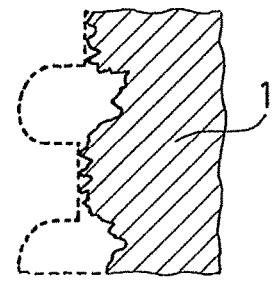
FIG. 4 shows the cylinder wall following blasting.

Following compression, the cylinder wall is blasted (see FIG. 3). For this purpose, a medium, for example water, is applied to the cylinder wall under high pressure (for example 500 bar to 3500 bar, in particular 1500 bar to 3500 bar) by means of a nozzle 9, which can for example be designed as a conventional circular jet nozzle or flat jet nozzle. As a result, the base material of the engine block 1 is eroded unevenly in the vicinity of the surface, whereby the erosion is greater in the uncompressed sections (the ribs) than in the compressed sections (the grooves). This can lead to the uncompressed sections which initially formed the ribs following compression forming the grooves of the structure after blasting (see FIG. 4, in which the structure existing prior to blasting is also indicated with broken lines). In addition, irregularly formed and arranged micro-depressions are created in all sections, which can in particular lead to an improvement in the adhesion of the coating finally applied to the machined cylinder wall.

Figure 5:
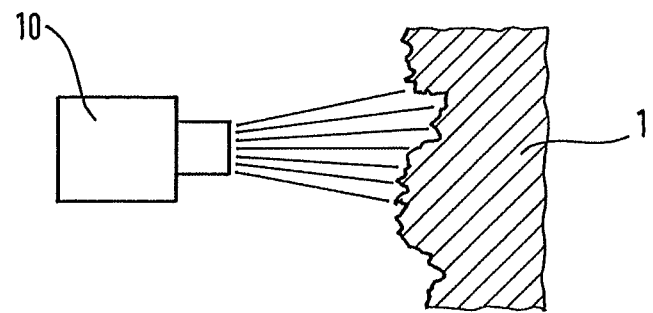
FIG. 5 shows the coating of the cylinder wall as a third step of the method according to the invention.

A coating is then applied to the machined cylinder wall (see FIG. 5). This serves as a running surface for a piston (not shown) guided in the cylinder 2 of the internal combustion engine. The coating can in particular be applied by means of thermal spraying (for example wire arc spraying) for which purpose a spray head 10 is, in a known manner, rotatingly driven and moved along the longitudinal axis 7 of the cylinder 2. The melted coating material can thereby penetrate into the grooves and micro-depressions, fill these and—after hardening—form a solid bond between the coating and the cylinder wall.

Figure 6:
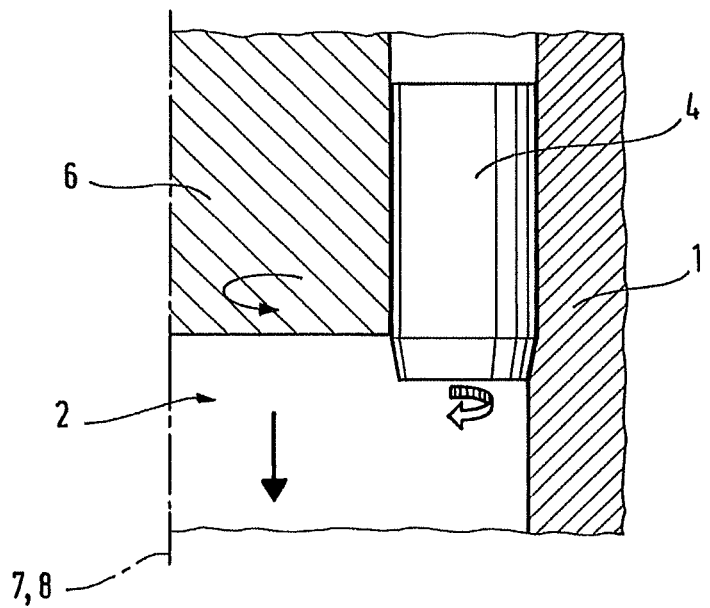
FIG. 6 shows a full-surface compression of a cylinder wall as an alternative—as opposed to partial compression—first step of a method according to the invention for coating a cylinder wall.

FIG. 6 shows a full-surface compression of the cylinder wall as an alternative first step of the previously described method according to the invention for coating a cylinder wall. "Full-surface" is understood to mean that the entire section of the cylinder wall machined or travelled over by the tool used for compression is compressed. This is not intended to rule out sections of the cylinder wall not being machined in this way and thus also not compressed. For full-surface compression, roller burnishing bodies 4 are used which have a substantially cylindrical outer surface.

If the engine block 1 has more than one cylinder 2, several and in particular all cylinders 2 can be processed according to the invention simultaneously.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for coating a cylinder wall of an internal combustion engine comprising the steps in the following order:
    a) compressing the cylinder wall only in parts by plastic deformation, wherein several compressed and uncompressed sections of the cylinder wall are created in alternating sequence;
    b) roughening the cylinder wall, wherein the roughening is achieved through blasting with a liquid or particulate medium or wherein the roughening is achieved through exposure by laser, wherein an erosion is greater in the uncompressed sections than in the compressed sections so that the uncompressed sections which initially formed ribs in the cylinder wall after the compressing step (a) forms grooves in the cylinder wall after the roughening step (b); and
    c) applying a coating to the cylinder wall.

2. The method of claim 1, wherein microdepressions are created by the roughening, the dimensions of which are smaller than comparable dimensions provided as a result of the only partial compression.

3. The method of claim 1, wherein the coating is sprayed in a molten state onto the cylinder wall and hardens.

4. The method of claim 1, wherein the coating is applied by thermal spraying.

5. The method of claim 4, wherein said coating is applied by wire arc spraying or plasma spraying.

* * * * *